United States Patent

[11] 3,547,173

[72] Inventors Robert P. Graham
El Cerrito;
Charles C. Huxsoll, San Pablo; Marcus R.
Hart, Concord; Merle L. Weaver,
Martinez, Calif.
[21] Appl. No. 784,746
[22] Filed Dec. 18, 1968
[45] Patented Dec. 15, 1970
[73] Assignee The United States of America as
represented by the Secretary of Agriculture

[54] PROCESS FOR PEELING POTATOES
2 Claims, 1 Drawing Fig.
[52] U.S. Cl. ..................................................... 146/231,
146/235, 146/49
[51] Int. Cl. ...................................................... A23n 7/02
[50] Field of Search ........................................... 146/230,
231, 232, 235, 241(P)

[56] References Cited
UNITED STATES PATENTS
3,115,176   12/1963   Walker ........................   146/241
3,017,298    1/1962   Wilson et al. ................   146/241
3,460,162    8/1969   Sijbring .......................   146/231X
3,480,057   11/1969   Wilhelm .....................   146/231

Primary Examiner—Willie G. Abercrombie
Attorneys—R. Hoffman, W. Bier and W. Takacs ABSTRACT: Potatoes are dipped in hot lye solution, held under controlled conditions to attain loosening of the peel and the major part of the peel is then removed by dry brushing. A prime advantage of the procedure is that the waste—the removed peel—is in a solid condition and easily disposed by burning.

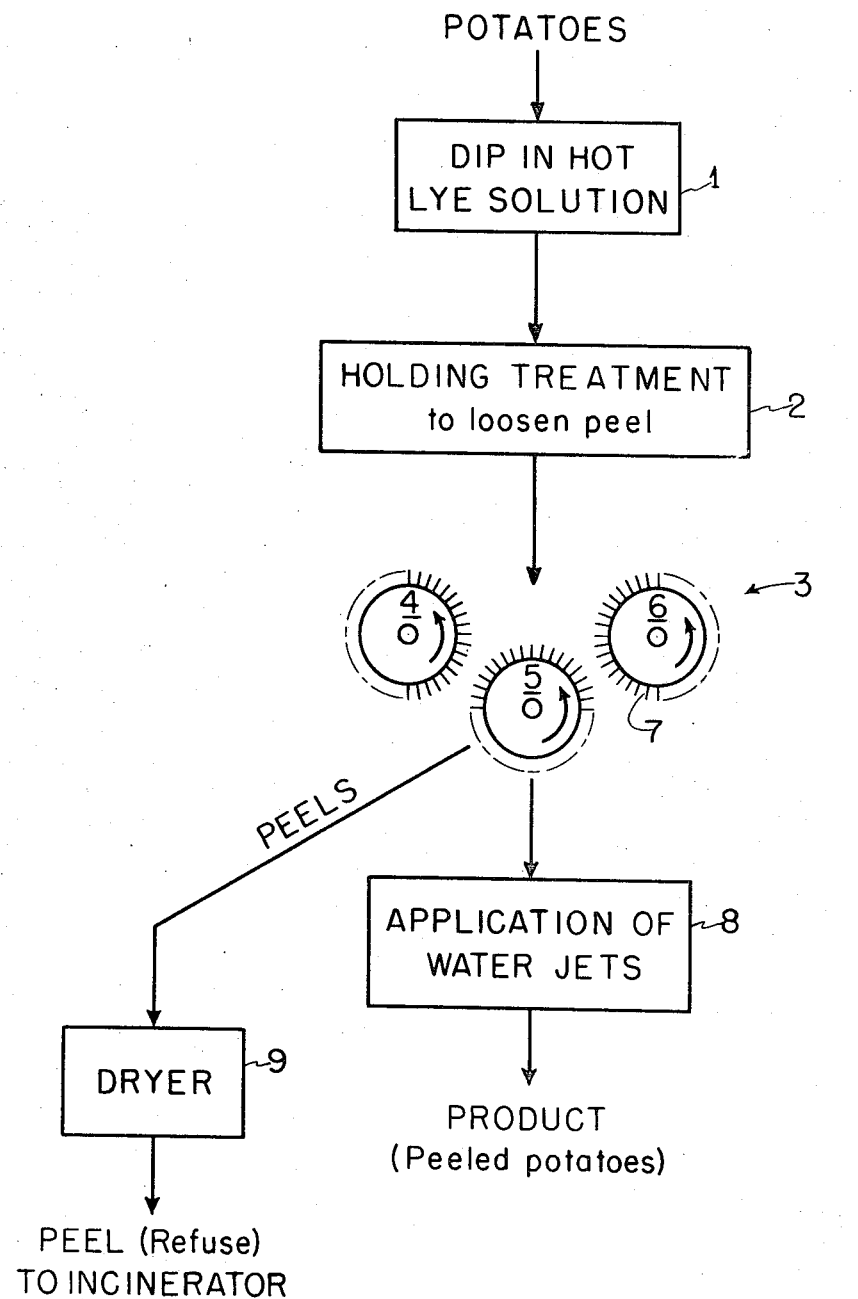

3,547,173

PROCESS FOR PEELING POTATOES

A nonexclusive, irrevocable, royalty-free license in the invention herein described, throughout the world for all purposes of the U.S. Government, with the power to grant sublicenses for such purposes, is hereby granted to the Government of the United States of America

DESCRIPTION OF THE INVENTION

This invention relates to and has among its objects the provision of novel processes for peeling potatoes. More particularly, the invention provides procedures which not only give efficient peeling results but also form waste material which is readily disposable. Further objects of the invention will be evident from the following description wherein parts and percentages are by weight unless otherwise specified.

The single FIG. in the annexed drawing is a schematic diagram or flowsheet of the process of the invention.

In conventional practice in food processing plants, potatoes are peeled by applying the following procedure: The potatoes are immersed in hot lye solution—e.g., a solution containing about 13 to 20 percent NaOH and maintained at a temperature of about 180° F. The potatoes are then removed from the lye solution, drained, and subjected to strong jets of water while rotated or tumbled about to expose all surfaces to the jets whereby the lye-loosened skin is flushed off the tubers. Although this procedure provides effective peeling, it has the disadvantage that it produces a large volume of wash water containing organic matter and sodium hydroxide. The disposal of this waste liquor presents a serious problem. If discharged directly into a stream it causes pollution of the water course. Moreover, biological destruction by ponding or the like is slow and inefficient, particularly because of the high alkalinity of the liquor. Of course, the liquor could be neutralized but this would involve additional expense for acid and for equipment for metering the acid and maintaining a predetermined pH. Because of the present emphasis be federal, state, and local governments on pollution control, food processors who rely on the procedure in question are facing a crisis—they must devise a disposal system which not only meets antipollution standards, but also does the job economically so that they can stay in business. A failure to meet these criteria means that the operations must be shut down.

A primary object of the invention is the provision of peeling methods which obviate the problems outlined above. A particular feature of the invention is that the conventional step of removing the lye-loosened peel with water is minimized. The major proportion of the peel is removed in a dry manner, and only a minor proportion of the peel is removed by flushing with water. As a consequence, the process of the invention yields a much reduced amount of liquid waste material—about 10 percent of that produced in conventional operations. Most of the peel is removed as a solid waste which can be burned directly, or after application of a minor degree of dehydration. Burning of the waste is not only an effective and economical method of disposal thereof but also the remaining ash can be treated to extract sodium carbonate therefrom. (The NaOH in the waste is converted into the carbonate during combustion.)

In addition to obviating the problem of waste disposal, the process of the invention provides effective peeling so that the peeled tubers are adapted for all conventional uses as in preparing dehydrated, prefried frozen, canned, and other potato products. The peeling losses average only about 7 to 15 percent.

In a practice of the invention, potatoes are first contacted with aqueous lye (NaOH). This is best done by immersing the tubers in the lye solution. Alternatively, the lye solution may be applied by spraying, brushing, or the like. Generally, the solution will contain about 13 to 30 percent of NaOH and is kept hot, i.e., at about 150—212° F. so it will penetrate rapidly into the corky tissue of the peel. When all surfaces of the potatoes have been thoroughly wetted with the lye solution, the tubers are ready for the next step. Preferably, but not necessarily, the lye-treated potatoes are drained—for example, by allowing them to roll down an inclined screen for a few seconds—before initiating the next step.

In the second step, the lye-treated potatoes are given a holding treatment. Thus they are held for a period of about 2 to 10 minutes at a temperature of 170 to 212° F. so that the lye on and in the peel of the tubers can act on the binding substances in the peel and those which hold the peel to the flesh. By this action the potatoes are brought to a state wherein the peel is in a soft and loosened state so that it can be easily removed in a subsequent step.

After the holding period, the potatoes are subjected to friction—for example, brushing—applied in the dry state. Excellent results are obtained by contacting the potatoes with a rotating cylinder, the surface of which is covered with protruding fingers of soft rubber, Neoprene, or other elastomer. The nonabrasive brushing effect obtained by the action of these fingers striking against the tubers causes the loosened peel to be dislodged quickly and without removal of any significant amount of potato flesh. Moreover, the peeling action is so effective that even the peel at indented areas (eyes) is removed. For large-scale operations, one may provide several drums (provided with soft rubber fingers) arranged with their axes parallel, and driven in such manner that each adjacent pair of drums rotate in the same direction but at slightly different speeds. By applying the treated potatoes to such an arrangement the tubers are continuously rolled and tumbled while being brushed by the rubber fingers, and the loosened peel is quickly dislodged. During the brushing, jets or air (at room temperature, or heated, for example, to 100—200° F.) may be directed against the potatoes to assist in dislodging the peels, and against the brushing device to blow particles of peel off the rubber fingers or other equipment parts.

It has been observed that application of friction in the dry state as described above results in removal of the major portion of the peel. The remaining part of peel—usually about 10—15 percent the original amount—is then easily removable by an application of jets of water. Thus, after the dry peel removal step, the tubers are subjected to jets of water in the conventional manner, with the proviso that only a small fraction of the usual amount of water is employed because the greatest part of the peel has already been removed. Following application of the water jets, the tubers are forwarded to the processing line for conversion into dehydrated, canned, frozen, or other products as desired by the operator.

The practice of the invention is further illustrated by the annexed drawing. Referring thereto, the potatoes to be peeled are first dipped in hot lye solution, and, preferably after a short draining period, are introduced into the holding unit designated as 2.

Holding unit 2 comprises typically a steam-heated inclosure and a conveyor belt for carrying the lye-treated potatoes through the inclosure. The belt is preferably driven by a variable speed mechanism so that the holding time may be set at a predetermined level.

After completion of the holding operation, the potatoes are fed to the peeling unit, generally designated as 3, which includes rollers 4, 5, and 6 each driven in the directions indicated by the arrows. The surface of each of the rollers is covered with protruding fingers 7 of soft rubber. In a typical installation wherein rollers 4, 5, and 6 have a diameter of about 8 inches, excellent peeling effects are obtained where roller 5 is rotated at about 500—600 r.p.m. and rollers 4 and 6 at a slower speed (about 400—450 r.p.m.). In a preferred arrangement, rollers 4, 5, and 6 are arranged with their axes parallel and sloping so that the potatoes will gradually be conveyed from the low end of the tier of rollers to the high end while being brushed and tumbled about by the coaction of the rollers and thereby producing a clean, peeled product.

After removal of most of the peel by the above-described brushing treatment, the potatoes are entered into unit 8 wherein they are exposed to jets of water to remove the minor part of the peel still on the tubers. After this washing treatment, the peeled potatoes are ready for processing into any selected end product by conventional procedures.

Suitable trays, pans, or the like may be positioned beneath rollers 4, 5, and 6 to receive the bits of peel brushed off the potatoes. As noted above, the removed peel is a mealy material, having a solids content of about 10 percent, which can be readily collected, dried to increase its solids content to about 30 percent in drier 9, and then disposed by burning in a conventional incinerator.

The invention is further demonstrated by the following illustrative examples.

EXAMPLE 1

One hundred and fifty pounds of potatoes (Russet variety) were dipped in an aqueous solution of NaOH (13 percent) for 60 seconds at 170° F. The lye pickup was determined by titration to be 0.18 pounds of NaOH per 100 pounds of potatoes.

After a 10 second drain, the lye-treated potatoes were held at 170° F. for 5 minutes. They were then subjected to dry brushing by application of rotating rolls covered with one-half inch long rubber projections. Thirteen pounds of peel material was removed. This material had a solids content of 17 percent.

The peeling was then finished by application of water sprays and nylon brushes. The loss in weight during this operation was 1.5 pounds.

The total loss in weight (both peeling operations) was 14.5 pounds, or 9.7 percent. The amount of peel material removed by the dry brushing step was 89 percent.

EXAMPLE 2

One hundred and fifty pounds of potatoes (Russet variety) were dipped in an aqueous solution of NaOH (13 percent) for 90 seconds at 170° F. The lye pickup was determined by titration to be 0.22 pound of NaOH per 100 pounds of potatoes.

After a 10 second drain, the lye-treated potatoes were held at 170° F. for 5 minutes. They were then subjected to dry brushing by application of rotating rolls covered with one-half inch long rubber projections. Fourteen pounds of peel material was removed. This material had a solids content of 17.5 percent.

The peeling was then finished by application of water sprays and nylon brushes. The loss of weight in this operation was 2 pounds.

The total loss in weight (both peeling operations) was 16 pounds, or 11 percent. The amount of peel material removed by the dry brushing step was 88 percent.

We claim:
1. A process for peeling potatoes which comprises:
   a. applying a hot lye solution to the potatoes;
   b. holding the lye-treated potatoes at 170—212° F. for a period of about 2 to 10 minutes,
   c. removing the major portion of the peel from the so-treated potatoes, without application of water, by dry brushing with soft, rubbery, non-abrasive elements; and
   d. removing the residual minor proportion of the peel by application of water jets.
2. The process of claim wherein the amount of peel removed in Step c is at least 85 percent.